United States Patent Office 2,982,746
Patented May 2, 1961

2,982,746
PROCESS FOR PREPARING POST-FORMED STYRENATED OIL-MODIFIED ALKYD RESINS UTILIZING MOLTEN PHTHALIC ANHYDRIDE

William Frederick Hart, Bridgeville, Pa., assignor to American Cyanamid Company, New York, N.Y., a corporation of Maine No Drawing. Filed Mar. 31, 1958, Ser. No. 724,897

12 Claims. (Cl. 260—22)

This invention relates to a novel method for producing styrenated glyceride oil-modified alkyd resins and to the product produced thereby. Still further, this invention relates to a novel process for producing styrenated oil-modified alkyd resins comprising adding molten phthalic anhydride to an esterified styrenated glyceride oil and/or comparable fatty acids and their monoglycerides.

One of the objects of the present invention is to produce styrenated glyceride oil-modified alkyd resins using molten phthalic anhydride. A further object of the present invention is to produce styrenated oil-modified alkyd resins by use of a novel technique which permits the production of coating resins of this class which resins display no indication of heterogeneity as a result of incompatibility of two or more components in the resin system. These and other objects of the present invention will be discussed in greater detail hereinbelow.

In the art relating to the manufacture of styrenated glyceride oil-modified alkyd resins, a plurality of processes have been tried both experimentally and commercially. One of the more generally used processes is to prepare a preformed glyceride oil-modified alkyd resin by reacting a polycarboxylic acid such as phthalic acid or its anhydride with a polyhydric alcohol such as glycerol in the presence of one or more glyceride oils or their glyceride fatty acids or their monoglycerides until esterification is substantially complete as indicated by comparatively low acid number, whereupon a mixture of a styrene such as styrene per se and a polymerization catalyst for said styrene is added to the preformed oil-modified alkyd resin and heating is continued until the polymerization and/or the interpolymerization of the styrene is substantially completed. An alternative procedure for making such a resinous material resides in the steps of adding a mixture of a polymerizable styrene and a catalyst therefor to a heated glyceride oil and continuing the heating until polymerization is substantially completed. Thereupon, there is added to the styrenated oil pre-calculated quantities of a polyhydric alcohol such as glycerol and a polycarboxylic acid such as phthalic anhydride. Esterification is then carried out to a comparatively low acid number. Each of these processes, although enjoying commercial usage, have certain shortcomings inasmuch as there is sometimes formed a mixture of resinous materials in one system wherein the various components of the mixture are not compatible with one another, and as a consequence, there results a heterogeneous mixture which displays its heterogeneity by displaying signs of haziness or even milkiness of the neat resin and/or haziness or milkiness in the ultimate films formed from the neat resin. The technique of the present invention clearly overcomes these shortcomings of the prior art.

In the practice of the process of the present invention, a glyceride oil is introduced into a suitable reaction vessel and is heated to a temperature between about 150 and 180° C. and preferably between about 160 and 170° C., and while holding at a temperature in this range, the mixture of a styrene and a polymerization catalyst therefor is added either instantaneously or in small increments over a period of time. The glyceride oil used may be either a semi-drying glyceride oil or a drying glyceride oil of which a great plurality are known in the art and are available commercially. Alternatively, one could make use of the fatty acids of these glyceride oils, or whenever available, their mono- and diglycerides. Among the glyceride oils which may be used in the practice of the process of the present invention are soya oil, linseed oil, dehydrated castor oil, perilla oil, safflower oil, tung oil, oiticica oil, rapeseed oil, mustard seed oil, herring oil, sardine oil, walnut oil, sunflower oil, and the like. Conjunctively or alternatively, one may make use of such acids as myristoleic, palmitoleic, oleic, linoleic, linolenic, elaeostearic, licanic, ricinoleic, erucic, and the like. Additionally, one may make use of tall oil fatty acids and preferably those which have been refined to remove not only the rosin acids found in tall oil but also to remove unsaponifiables, water and ash generally found in tall oil. Quite obviously, mixtures of these oils and/or their fatty acids may be utilized. Still further, the monoglycerides and the diglycerides of these fatty acids, whenever available, may be utilized either singly or in combination with one another or with their fatty acids or with the oils. It is preferred to use the non-conjugated type of drying and/or semi-drying oils either alone or in predominant amounts such as about 95% based on the total weight of the oil material used. The total amount of oily material used can readily be calculated in advance after one has decided whether or not to make a short oil-modified alkyd resin, a medium oil or a long oil-modified alkyd resin. Since these concepts are well known in the art, further delineation thereof is deemed unnecessary at this point. It should be sufficient to say that the development of the art is such that a skilled resin chemist can predetermine the amount of oil to be charged to a reaction vessel in the practice of the process of the present invention while considering the amounts of the polymerizable styrene, the amounts of polyhydric alcohol and the amount of the molten phthalic anhydride to be added subsequently.

Among the polymerizable monomeric styrenes which may be used in the practice of the process of the present invention are styrene per se, and both ring and side chain substituted styrenes such as ring and side chain substituted halo styrenes and alkyl styrenes. More specifically, one may make use of alpha-chlorostyrene, alpha-methylstyrene, ortho-methylstyrene, meta-methylstyrene, para-methylstyrene, 2,4-dimethylstyrene, 2,5-dimethylstyrene, 3,4-dimethylstyrene, 2,4,5-trimethylstyrene, 2,4,5-triethylstyrene, para-ethylstyrene, ortho-bromostyrene, 2,4-bromo-4-ethylstyrene, para-isopropylstyrene, para-chlorostyrene, 2,4-dichlorostyrene, and the like. If desired, one can make use of other substituted styrenes whether the substituent be on the ring or on the side chain, whether the substituent be reactive or unreactive. Included in such substituted styrenes would be the isocyanato substituted styrenes, the nitro styrenes, the hydroxyl styrenes, and the like. The total amount of polymerizable styrene to be used will vary between about 15% and about 60% by weight based on the total weight of ultimate reactants in the system including the glyceride oil, the polyhydric alcohol and the phthalic anhydride plus, of course, the polymerizable styrene. If for purposes requiring particular properties in the ultimate product such as gasoline resistance, if it is desired, one may introduce in addition to the polymerizable styrene a polymerizable acrylonitrile such as acrylonitrile per se, methacrylonitrile, ethacrylonitrile, alpha-chloroacrylonitrile, and the like. Although the styrene may be used alone to the exclusion of any monomeric acrylonitrile, if the mixture of different polymerizable monomers is undertaken, the monomeric styrene to the monomeric acrylonitrile should be used within the range of about 19:1 and 1:1, respectively.

The polymerization catalyst used in the process of the present invention should be a peroxide type catalyst such as benzoyl peroxide, cumene hydroperoxide, tertiary alkyl substituted hydroperoxides and diperoxides such as 2,2'-bis(tertiary butyl peroxide)butane, ditertiary butyl peroxide, tertiary butyl hydroperoxide, tertiary butyl propyl peroxide, tertiary butyl pentamethylethyl peroxide, and the like. These catalytic agents obviously can be used either separately or in combination with one another. It is only necessary that a comparatively small amount of these catalytic agents be present such as about 0.5% to about 5.0% by weight based on the total weight of the polymerizable monomeric material and the glyceride oil material.

After the glyceride oil material has been styrenated, one then adds in predetermined quantities a polyhydric alcohol having an average hydroxy functionality greater than 2 and carries out the esterification until an acid number of about 20 or below is reached indicating substantially complete esterification with some residual hydroxy groups available. Among the polyhydric alcohols which may be used in the practice of the process of the present invention are glycerol, trimethylol propane, trimethylol ethane, sorbitol, pentaerythritol, dipentaerythritol, adonitol, mannitol, pinacol, arabitol, and the like. Obviously, these polyhydric alcohols may be used either singly or in combination with one another. If desired, dihydric alcohols may be used in combination with those polyhydric alcohols having three or more hydroxy groups so as to provide a mixture of polyhydric alcohols having an average functionality of hydroxy groups greater than 2 and preferably greater than 2.5. Among the dihydric alcohols which may be used in this connection are ethylene glycol, diethylene glycol, propylene glycol, dipropylene glycol, trimethylene glycol, tetramethylene glycol, or the alkanediols such as hexanediol-1,6 and the like. The amount of polyhydric alcohol used in the practice of the process of the present invention can readily be determined by a skilled chemist on a purely stoichiometrical basis. When the oil length of the ultimate alkyd resin has been determined, the amount of phthalic anhydride ultimately to be added is determined and the amount of polyhydric alcohol or mixtures thereof can readily be ascertained with accuracy by calculating the amount of polyhydric alcohol required to substantially completely esterify all of the carboxyl groups available for reaction in the system in the entire course of the reaction. It is generally preferred for most purposes to use a slight excess of polyhydric alcohol as a further assurance of substantially complete esterification. This slight excess may be 5%, 10% or even as much as 25% based on the stoichiometrical calculations.

When the styrenated oil and polyhydric alcohol have been reacted together to substantially complete esterification of the available carboxyl groups, the separately heated molten phthalic anhydride is then introduced while maintaining the temperature of the esterified styrenated oil at about 220° C. to about 240° C. The molten phthalic anhydride may be added instantaneously or it may be added over a period of time in partial quantities. If the molten anhydride is to be added instantaneously, the styrenated glyceride oil should be held at a temperature higher than about 240° C. such as about 260° C. so that upon the addition of the molten phthalic anhydride, the temperature will not drop because of the cooling effect of the molten anhydride below about 220° C. After the molten phthalic anhydride addition is completed, the charge is then heated to overcome any cooling effect that said addition would have to a temperature between about 260 and 280° C. The charge may then be held at these temperatures until an acid number between about 5 and 20 is reached. It is preferred to hold the charge to an acid number between about 7 and 15. When this acid number is reached, the heating is gradually tapered off and when a temperature of about 240° C. is reached, the charge may be cooled to room temperature and cut with appropriate solvents to a given solids content as desired.

Since these resinous materials will be utilized primarily in the field of coating resins, it may be desired to add to the resin solution conventional small amounts of metallic driers such as cobalt naphthenate, lead naphthenate, and the like. Additionally, one may make use of such conventional surface coating ingredients as pigments, anti-skimming agents, anti-cratering agents, and the like. Mention has been made hereinabove about the use of inert organic solvents with which the neat resin produced according to the process of the present invention may be cut, of which a great plurality are known and are available commercially. Reference is made to the U.S. Patent 2,748,092 for a description of suitable solvents for the purpose.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel equipped with thermometer and stirrer, there is introduced 287 parts of refined tall oil fatty acids. The fatty acids are heated to a temperature of about 285 to 295° F. and while holding at that temperature, there is added a mixture of 416 parts of a mixture of ortho-methylstyrene, meta-methylstyrene, para-methylstyrene (30% ortho, 3% meta and 67% para), and 9.6 parts of ditertiary butyl peroxide over a four-hour period. When the addition of the monomer-catalyst mixture has been completed, the batch is held for about one hour at 285° F. An inert gas is then admitted to the reaction sphere through a sparging ring and the batch is heated to about 390° F. and held at that temperature for about one hour while continuing the inert sparging. There is then added 75.6 parts of glycerol and 35.7 parts of pentaerythritol and the charge is heated to about 410–450° F. The batch is held at that temperature until an acid number of between 5 and 15 is obtained. Thereupon, 148 parts of molten phthalic anhydride are added while maintaining a batch temperature of 420–460° F. The mixture is held at about 440–490° F. until an acid number of 5 to 20 is obtained. The batch is then cooled and cut in a suitable solvent to the desired resin solids content. The resin solids content is not critical and may be calibrated to ultimate end use such as brush coating, roller coating or even spray coating purposes.

Example 2

Into a suitable reaction vessel equipped with thermometer and stirrer, there is introduced 287 parts of refined tall oil fatty acids. The fatty acids are heated to a temperature of about 285 to 295° F. and while holding at that temperature, there is added a mixture of 508 parts of a mixture of ortho-methylstyrene, meta-methylstyrene, para-methylstyrene (30% ortho, 3% meta and 67% para), and 11.5 parts of ditertiary butyl peroxide over a four-hour period. When the addition of the monomer-catalyst mixture has been completed, the batch is held for about one hour at 285° F. An inert gas is then admitted to the reaction sphere through a sparging ring and the batch is heated to about 390° F. and held at that temperature for about one hour while continuing the inert sparging. There is then added 75.6 parts of glycerol and 35.7 parts of pentaerythritol and the charge is heated to about 410–450° F. The batch is held at that temperature until an acid number of between 5 and 15 is obtained. Thereupon, 148 parts of molten phthalic anhydride are added while maintaining a batch temperature of 420–450° F. The mixture is held at about 440–490° F. until an acid number of 5 to 20 is obtained. The batch is then cooled and cut in a suitable solvent to the desired resin solids content.

*Example 3*

Into a suitable reaction vessel equipped with thermometer and stirrer, there is introduced 478 parts of refined tall oil fatty acids. The fatty acids are heated to a temperature of about 285 to 295° F. and while holding at that temperature, there is added a mixture of 582 parts of a mixture of ortho-methylstyrene, meta-methylstyrene, para-methylstyrene (30% ortho, 3% meta and 67% para), and 13.2 parts of ditertiary butyl peroxide over a four-hour period. When the addition of the monomer-catalyst mixture has been completed, the batch is held for about one hour at 285° F. An inert gas is then admitted to the reaction sphere through a sparging ring and the batch is heated to about 390° F. and held at that temperature for about one hour while continuing the inert sparging. There is then added 93 parts of glycerol and 43 parts of pentaerythritol and the charge is heated to about 410–450° F. The batch is held at that temperature until an acid number of between 5 and 15 is obtained. Thereupon, 148 parts of molten phthalic anhydride are added while maintaining a batch temperature of 420–460° F. The mixture is held at about 440–490° F. until an acid number of 5 to 20 is obtained. The batch is then cooled and cut in a suitable solvent to the desired resin solids content.

*Example 4*

Into a suitable reaction vessel equipped with thermometer and stirrer, there is introduced 525 parts of refined tall oil fatty acids. The fatty acids are heated to a temperature of about 285 to 295° F. and while holding at that temperature, there is added a mixture of 379 parts of a mixture of ortho-methylstyrene, meta-methylstyrene, para-methylstyrene (30% ortho, 3% meta and 67% para), and 11.7 parts of ditertiary butyl peroxide over a four-hour period. When the addition of the monomer-catalyst mixture has been completed, the batch is held for about one hour at 285° F. An inert gas is then admitted to the reaction sphere through a sparging ring and the batch is heated to about 390° F. and held at that temperature for about one hour while continuing the inert sparging. There is then added 149 parts of pentaerythritol and the charge is heated to about 410–450° F. The batch is held at that temperature until an acid number of between 5 and 15 is obtained. Thereupon, 148 parts of molten phthalic anhydride are added while maintaining a batch temperature of 420–460° F. The mixture is held at about 440–490° F. until an acid number of 5 to 20 is obtained. The batch is then cooled and cut in a suitable solvent to the desired resin solids content.

*Example 5*

Into a suitable reaction vessel equipped with thermometer and stirrer, there is introduced 287 parts of refined tall oil fatty acids. The fatty acids are heated to a temperature of about 285 to 295° F. and while holding at that temperature, there is added a mixture of 220 parts of a mixture of ortho-methylstyrene, meta-methylstyrene, para-methylstyrene (30% ortho, 3% meta and 67% para), and 6.8 parts of ditertiary butyl peroxide over a four-hour period. When the addition of the monomer-catalyst mixture has been completed, the batch is held for about one hour at 285° F. An inert gas is then admitted to the reaction sphere through a sparging ring and the batch is heated to about 390° F. and held at that temperature for about one hour while continuing the inert sparging. There is then added 116 parts of pentaerythritol and the charge is heated to about 410–450° F. The batch is held at that temperature until an acid number of between 5 and 15 is obtained. Thereupon, 148 parts of molten phthalic anhydride are added while maintaining a batch temperature of 420–460° F. The mixture is held at about 440–490° F. until an acid number of 5 to 20 is obtained. The batch is then cooled and cut in a suitable solvent to the desired resin solids content.

*Example 6*

Into a suitable reaction vessel equipped with thermometer and stirrer, there is introduced 525 parts of refined tall oil fatty acids. The fatty acids are heated to a temperature of about 285 to 295° F. and while holding at that temperature, there is added a mixture of 513 parts of a mixture of ortho-methylstyrene, meta-methylstyrene, para-methylstyrene (30% ortho, 3% meta and 67% para), and 15.8 parts of ditertiary butyl peroxide over a four-hour period. When the addition of the monomer-catalyst mixture has been completed, the batch is held for about one hour at 285° F. An inert gas is then admitted to the reaction sphere through a sparging ring and the batch is heated to about 390° F. and held at that temperature for about one hour while continuing the inert sparking. There is then added 149 parts of pentaerythritol and the charge is heated to about 410–450° F. The batch is held at that temperature until an acid number of between 5 and 15 is obtained. Thereupon, 148 parts of molten phthalic anhydride are added while maintaining a batch temperature of 420–460° F. The mixture is held at about 440–490° F. until an acid number of 5 to 20 is obtained. The batch is then cooled and cut in a suitable solvent to the desired resin solids content.

I claim:

1. A process comprising heating and polymerizing a polymerizable styrene in the presence of a material selected from the group consisting of drying glyceride oils, semi-drying glyceride oils, their glyceride fatty acids and their monoglycerides, and a polymerization catalyst until polymerization is substantially complete, adding a saturated aliphatic polyhydric alcohol having a hydroxy average functionality greater than 2 and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

2. A process comprising heating and polymerizing a polymerizable styrene in the presence of a material selected from the group consisting of drying glyceride oils, semi-drying glyceride oils, their glyceride fatty acids and their monoglycerides, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

3. A process comprising heating and polymerizing a polymerizable styrene in the presence of tall oil fatty acids, and a polymerization catalyst until polymerization is substantially complete, adding a saturated aliphatic polyhydric alcohol having a hydroxy average functionality greater than 2 and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

4. A process comprising heating and polymerizing styrene in the presence of a material selected from the group consisting of drying glyceride oils, semi-drying glyceride oils, their glyceride fatty acids and their monoglycerides, and a polymerization catalyst until polymerization is substantially complete, adding a saturated aliphatic polyhydric alcohol having a hydroxy average functionality greater than 2 and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

5. A process comprising heating and polymerizing a mixture of ortho-methyl styrene, meta-methyl styrene and para-methyl styrene in the presence of a material selected from the group consisting of drying glyceride oils, semi-drying glyceride oils, their glyceride fatty acids and their monoglycerides, and a polymerization catalyst until polymerization is substantially complete, adding a saturated aliphatic polyhydric alcohol having a hydroxy average functionality greater than 2 and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

6. A process comprising heating and polymerizing a polymerizable styrene in the presence of soya oil fatty acids, and a polymerization catalyst until polymerization is substantially complete, adding a saturated aliphatic polyhydric alcohol having a hydroxy average functionality greater than 2 and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280 C. until an acid number between about 5 and 20 is reached.

7. A process comprising heating and polymerizing a polymerizable styrene in the presence of tall oil fatty acids, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

8. A process comprising heating and polymerizing a polymerizable styrene in the presence of soya oil fatty acids, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

9. A process comprising heating and polymerizing styrene in the presence of tall oil fatty acids, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

10. A process comprising heating and polymerizing a mixture of ortho-methyl styrene, meta-methyl styrene and para-methyl styrene in the presence of tall oil fatty acids, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

11. A process comprising heating and polymerizing styrene in the presence of soya oil fatty acids, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

12. A process comprising heating and polymerizing a mixture of ortho-methyl styrene, meta-methyl styrene and para-methyl styrene in the presence of soya oil fatty acids, and a polymerization catalyst until polymerization is substantially complete, adding glycerol and heat reacting to an acid number below 20, adding thereto molten phthalic anhydride while holding the charge at a temperature between about 220° C. and 240° C. and continuing the heating after the molten phthalic anhydride addition has been completed to a temperature of about 260° C. and 280° C. until an acid number between about 5 and 20 is reached.

References Cited in the file of this patent

UNITED STATES PATENTS

| | | |
|---|---|---|
| 2,495,458 | Kanning et al. | Jan. 24, 1950 |
| 2,639,270 | Griess | May 9, 1953 |
| 2,840,547 | Stump | June 24, 1958 |

UNITED STATES PATENT OFFICE
CERTIFICATE OF CORRECTION

Patent No. 2,982,746

May 2, 1961

William Frederick Hart

It is hereby certified that error appears in the above numbered patent requiring correction and that the said Letters Patent should read as corrected below.

Column 6, line 26, for "sparking" read -- sparging --.

Signed and sealed this 3rd day of October 1961.

(SEAL)
Attest:

ERNEST W. SWIDER
Attesting Officer

DAVID L. LADD
Commissioner of Patents